March 2, 1926.  A. L. PUTNAM  1,574,933

SECURING DEVICE FOR DISK WHEELS

Filed Oct. 27, 1919

Inventor
Alden L. Putnam

By Whittemore, Hulbert & Whittemore
Attorneys

Patented Mar. 2, 1926.

1,574,933

UNITED STATES PATENT OFFICE.

ALDEN L. PUTNAM, OF DETROIT, MICHIGAN, ASSIGNOR, BY MESNE ASSIGNMENTS, OF ONE-HALF TO MOTOR WHEEL CORPORATION, OF LANSING, MICHIGAN, A CORPORATION OF MICHIGAN, AND ONE-HALF TO THE MIDLAND STEEL PRODUCTS COMPANY, OF CLEVELAND, OHIO, A CORPORATION OF OHIO.

SECURING DEVICE FOR DISK WHEELS.

Application filed October 27, 1919. Serial No. 333,860.

*To all whom it may concern:*

Be it known that I, ALDEN L. PUTNAM, a citizen of the United States of America, residing at Detroit, in the county of Wayne and State of Michigan, have invented certain new and useful Improvements in Securing Devices for Disk Wheels, of which the following is a specification, reference being had therein to the accompanying drawings.

The invention relates to demountable wheels of the disk type and has for its object the obtaining of improved securing means, as hereinafter set forth.

A is the hub having the radially outwardly extending flange B provided with a series of studs C for engaging registering apertures D in the disk E. As usually constructed, the disks are provided with laterally extending flanges F for seating upon a shoulder H on the hub and are held in position by clamping nuts engaging the studs. As the thickness of the disk is comparatively slight, the bearing upon the studs is correspondingly limited, and it is necessary to rely to a considerable extent upon frictional clamping means. In case the clamp becomes loosened, the torque stresses transmitted from the studs to the disk through the limited bearing are apt to enlarge the hole and soon cause lost motion.

Figure 1:
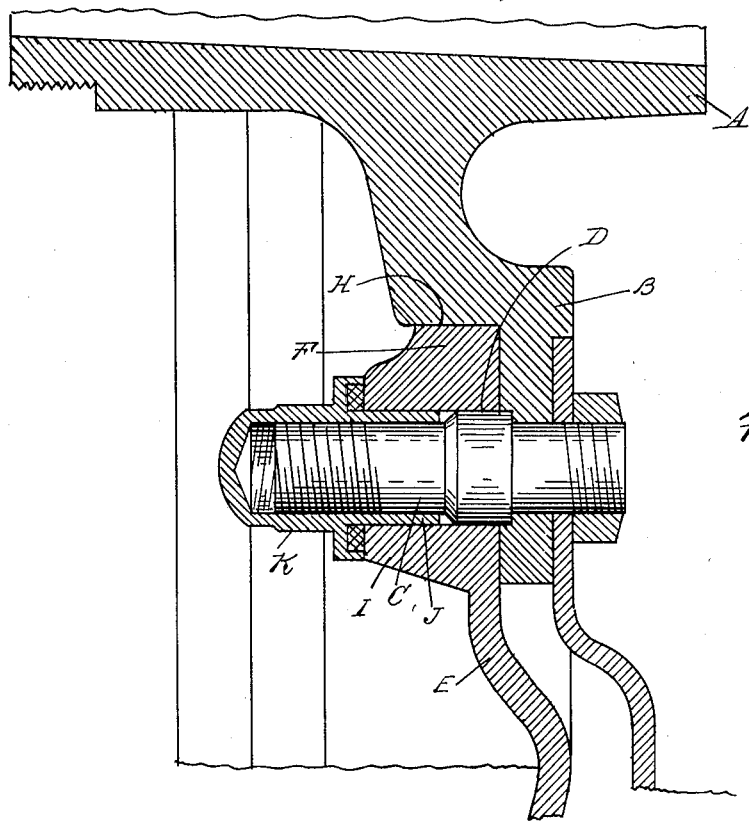
Figure 1 is a section through a portion of the hub and disk of a wheel, showing my improved securing means therefor.
Figure 2:
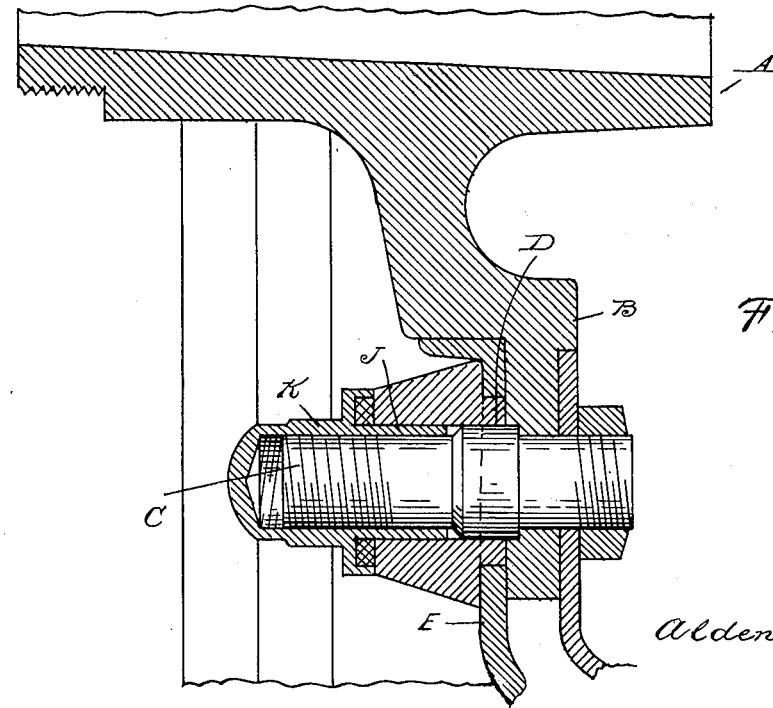
Figure 2 is a similar view of a modified construction.

With the present construction the bearing surface for the studs is greatly increased by providing the disk with laterally-projecting lugs I. These lugs are formed either as an integral part of the disk, as shown in Figure 1, or attached thereto, as shown in Figure 2, and the apertures for receiving the studs extend completely through the lugs. It is not, however, feasible to form recesses which accurately fit the studs throughout the full thickness of the lugs for the reason that it would be extremely difficult to engage a plurality of spaced studs with such long bearings. This difficulty I have avoided by providing clearance between the outer portions of the studs and the inner faces of the recesses, and subsequently inserting bushings to fill these spaces. Preferably, the bushings J are formed as extensions of the nuts K which engage the threaded portions of the studs and the arrangement is such that when the nuts are screwed inward upon the studs, they will force the bushings into the recesses.

With the construction as described when the wheel is in use, the long bearings upon the studs will distribute the torque stresses, so as to relieve from excessive pressure at any one point. On the other hand, when the disk is to be removed or replaced, it can be easily withdrawn or re-engaged with the studs and without any tendency to cramp.

What I claim as my invention is:

1. In a wheel, the combination with a member having a stud projecting therefrom having a reduced outer portion, of a member mounted on said first-mentioned member having an apertured portion for engaging said stud provided with a bearing engaged by the inner portion of the stud and having a clearance from the reduced outer portion of the same, and a bushing for filling the clearance between said stud and apertured member detachably engaging said member to extend the length of bearing.

2. In a wheel, the combination with a member having a stud projecting therefrom, of a member mounted on said first-mentioned member having an apertured portion for engaging said stud provided with a bearing thereon at the inner end, the outer portion of said stud having a clearance from the apertured portion, a clamping nut for said last-mentioned member engaging said stud, and a bushing on said clamping nut for filling the clearance space to extend the length of bearing on the stud.

3. In a demountable wheel, the combination with a hub, of a stud projecting laterally from said hub, a disk for mounting on said hub having a portion increased in thickness and apertured for engagement with said stud, said stud having its inner portion fitting said aperture and its outer portion reduced in diameter to provide a clearance, a nut for engaging said stud and clamping said disk, and a bushing on said nut for filling said clearance space and extending the length of bearing on the stud.

4. In a wheel, the combination with two members thereof, of a clamping connection between said members comprising a projection from one of the members engaging in an aperture of the other and affording a bearing for the latter in one end portion of said aperture, a clamping member engageable with said projection, and a bushing on said clamping member for filling the clearance space around said projection within said aperture and extending the length of said bearing.

In testimony whereof I affix my signature.

ALDEN L. PUTNAM.